No. 734,891. PATENTED JULY 28, 1903.
H. A. KNOX.
VARIABLE SPEED MECHANISM.
APPLICATION FILED FEB. 19, 1903.
NO MODEL. 2 SHEETS—SHEET 1.
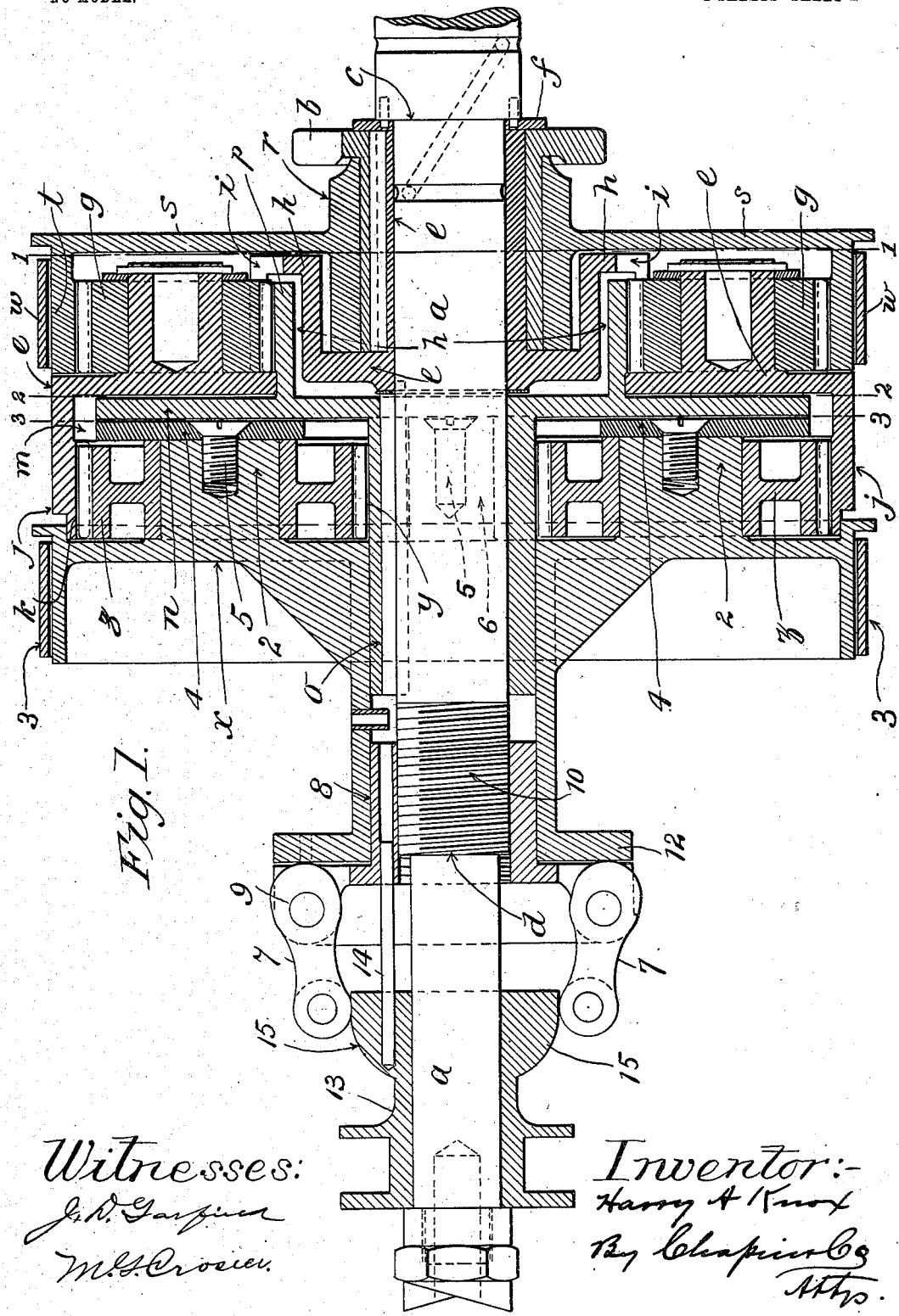
Fig. I.
Witnesses:
J. D. Garfield
M. S. Crosier
Inventor:—
Harry A Knox
By Chapin & Co
Attys.

No. 734,891. PATENTED JULY 28, 1903.
H. A. KNOX.
VARIABLE SPEED MECHANISM.
APPLICATION FILED FEB. 19, 1903.
NO MODEL. 2 SHEETS—SHEET 2.
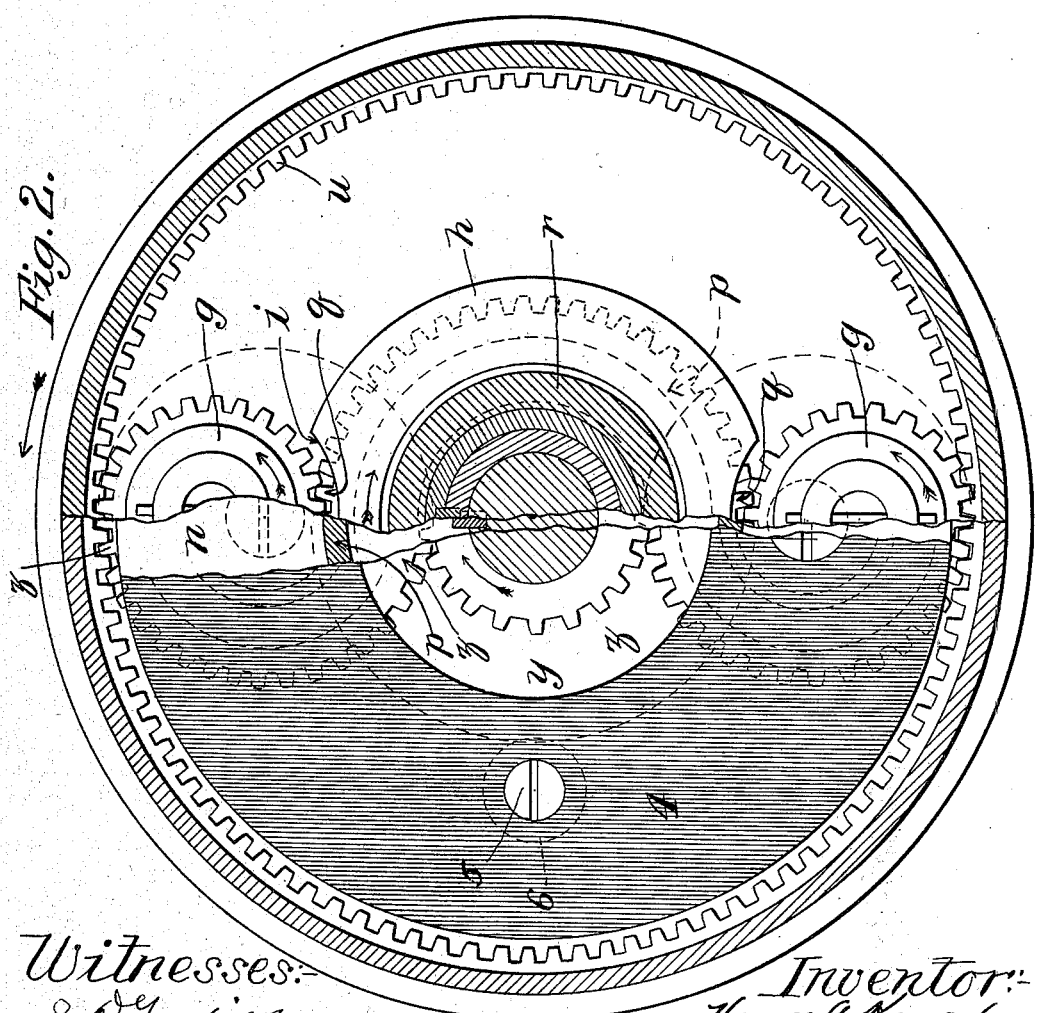

No. 734,891.

Patented July 28, 1903.

UNITED STATES PATENT OFFICE.

HARRY A. KNOX, OF SPRINGFIELD, MASSACHUSETTS, ASSIGNOR TO KNOX AUTOMOBILE COMPANY, OF SPRINGFIELD, MASSACHUSETTS, A CORPORATION.

VARIABLE-SPEED MECHANISM.

SPECIFICATION forming part of Letters Patent No. 734,891, dated July 28, 1903.

Application filed February 19, 1903. Serial No. 144,046. (No model.)

*To all whom it may concern:*

Be it known that I, HARRY A. KNOX, a citizen of the United States of America, residing at Springfield, in the county of Hampden and State of Massachusetts, have invented new and useful Improvements in Variable-Speed Mechanism, of which the following is a specification.

This invention relates to the construction of variable-speed mechanism, the object thereof being to improve the construction of mechanism of this type, the improvements being directed more particularly to the incorporation of a clutching device in the mechanism in such manner as to protect its frictional surfaces from the dust, &c., and to the arrangement of the parts of the clutch mechanism and its association with the supports for the speed-changing gears in such manner that no strains are placed on the gears proper when the clutch is in use.

The invention consists in the combination of elements, as fully described, and set forth in the claims.

In the drawings forming part of this application, Figure 1 is a longitudinal section of a mechanism embodying this invention; and Fig. 2 is a cross-sectional view taken on the planes indicated by the lines 1, 2, and 3, Fig. 1.

In carrying out this invention the driving-shaft $a$ is made with a shoulder $c$ thereon near one end of that part shown in Fig. 1 of the drawings and with another shoulder $d$ thereon located not far from the opposite end. Between these shoulders all of the gearing and clutch mechanism is mounted, except the devices for imparting endwise motion to one of the clutch members.

The principal intermediate member, located between the shaft $a$ and the sprocket-wheel $b$, is the member indicated by $e$, which, as shown in Fig. 1, is provided with a long hub which is fitted onto the shaft $a$ with the end of the hub against the shoulder $c$ on the shaft, there being interposed between said shoulder and said hub a bearing-ring $f$, which may be omitted. The sprocket-wheel $b$ is provided with a hub substantially equal to the length of the hub on the member $e$, over which it fits and to which it is securely keyed.

On that side of the member $e$ from which its hub projects are two pinions $g$, which rotate on studs preferably cast on $e$. Concentrically on the same side of the member $e$ there is cast a double-walled flange which is lettered $h$ and whose sides are parallel with the axis of the shaft, the walls of this flange constituting the boundary of what is an annular recess $h'$ when looked at from the opposite side of the member $e$. At two opposite points the outer wall of this flange is cut away, as indicated by $i$, this cut being made to permit the teeth of the pinions $g$ to enter the said annular recess $h'$, (to engage another gear to be described,) of which the walls of the flange $h$ form the boundaries.

The periphery of the intermediate member $e$ is flanged on that side thereof opposite to that on which the pinions $g$ are mounted, said flange extending at right angles to the plane of said member $e$. The flange is indicated by $j$ and carries an internal rack $k$, which, it will be observed by reference to Fig. 1, does not extend to the full width of the flange $j$, a space $m$ being left between the wall of the member $e$ and the inner ends of the teeth of the rack $k$, within which space is located a circular member $n$, having a long hub $o$, fitting on and keyed to the driving-shaft $a$ in a fixed position, said member being located in very close proximity to that side of the member $e$ under the flange $j$.

On that side of the circular member $n$ contiguous to the member $e$ there is cast a circular flange $p$, (parallel with the axis of the shaft,) which is located in the annular recess $h'$, on which flange gear-teeth $q$ are cut, (see Fig. 2,) which gear-teeth mesh with the teeth of the pinions $g$ through the cut-away portions $i$ of the circular flange $h$. On a hub $r$, which rotates freely on the hub of the sprocket-wheel $b$, another circular member $s$ is carried, on the periphery of which is a flange $t$, lying at right angles to the member $s$, and whose inner surface is provided with gear-teeth $u$, which also mesh with the teeth of the pinions $g$. The outer edge of the member $s$ is carried somewhat beyond the surface of the outside flanges on these members to hold in place the brake-strap $w$, which encircles the flange $t$ of said member. Thus we have the circular member n keyed to the shaft, the circular member e loose on the shaft, and the circular member s running loosely on the hub of the member e, with pinions g mounted on the last-named member and engaging with teeth on the members n and s. Therefore if the brake-strap w be tightened around the flange t of the member s the internal rack on said flange will become stationary and the member n, rotating with the shaft a, will cause the pinions g to travel around on said stationary rack, and thus rotate the member e and with it the sprocket-wheel b or any other transmission member, as a gear, for example, which may be secured to the member e to rotate with it. This described combination of clutch and gears thus rotates the sprocket-wheel b at one speed. To obtain another rate of speed in the opposite direction, the circular member x is provided, which is loosely mounted on the hub o of the member n, and on the latter is a second gear y of a different diameter from the gear on the flange p, (see Fig. 2,) in this case of smaller diameter than said gear, and on said circular member x the pinions z are carried on studs 2. These pinions z mesh both with the gear y on the hub o and with the gear-teeth cut on the inner surface of the flange j of the member e. A brake-strap 3 is provided for this member x, whereby it may be held against rotation, whereupon the member e will be rotated in a direction the reverse of that of the shaft a, the pinion z being held stationary and acting only as an intermediate between the gear y and the internal rack on the member e. The speed of rotation of the member e under these conditions will be relative to the rotation of the shaft a as the diameter of the gear y is to the diameter of the member e, measured, of course, on the pitch-line of the several gears, and the speed of the member e when the member s is held against rotation will be as to the speed of the shaft as the diameter of the gear on the flange p is to the diameter of the member s, measured also on the pitch-line of the two gears. When the member s is held, the direction of the rotation of the member e is with the shaft, and when the member x is held its direction of rotation is reversed. Now to obtain a speed of the member e, and consequently of the sprocket-wheel, equal to that of the shaft and in the same direction novel means are provided herein for clutching the member e to the member n, which is fixed on the shaft by mechanism to impart an endwise sliding movement to the member x, whereby the member n is clamped between the members e and x, and all of these parts therefore will rotate through said member n in unison with the shaft without subjecting the various gears to any strain or wear.

That part of the member e between the circular flange p and the periphery of e and contiguous to the member n constitutes the abutment against which said member n is forced when the member x moves endwise, as mentioned above, said member n having a very slight endwise motion on the shaft toward the member e. On said member x there is a ring 4, which is secured, by means of screws 5, to the studs 2 and to two other studs 6, cast on x, one of which is shown in dotted lines in Fig. 2 and another in dotted lines on Fig. 1, this ring serving, incidentally, as a means for retaining the pinions z on their bearings.

The means to impart endwise motion to the member x consists in the cam-levers 7, pivotally supported on a member 8 at 9, which is screwed onto the shaft, which is threaded at 10 to receive it. The outside diameter of said member 8 is the same as the hub o, and the hub of the member x has a bearing on the member h, as well as on the hub o, and on the end of the hub of the member x there is a flange 12, against which the cam-levers 7 may bear.

On that part of the shaft a lying beyond the shoulder d is a sliding collar 13, which by any suitable means may be moved endwise on the shaft a to cause the free end of the cam-levers 7 to swing outwardly, said collar having pins 14 fixed therein, which have a sliding movement in holes bored in the member 8, whereby the collar 13 is made to rotate with the shaft. By moving the collar 13 to the right (see Fig. 1) the free ends of the lever will move down the inclined surfaces 15 and effect the unclutching of the member n. No spring to retract the member x is required, as the rotative movements of the various parts will effect their separation.

The ring 4, constituting, as it does, a retaining means for the pinions z, when the member x is moved up into clutching position the pressure on said ring will bind the pinions z and prevent them from rattling during such time as the member e is being driven direct from the shaft through the clutch engagement thereof above referred to.

From the foregoing description it is clear that a novel and very compact construction of the planetary gearing whereby one change of speed may be imparted to the transmission member b in the same direction as that of the motor is provided, and also means to obtain another rate of speed in a different direction to that of the motor, together with a clutch mechanism whereby the transmission member may be directly connected to the shaft frictionally, and which clutch member is entirely inclosed and protected, therefore, against the intrusion of dirt and the wear of the parts therefore greatly prolonged.

It is clear that by clamping the member n between the other two circular members which support the pinions a direct connection is established between the driving-shaft and the driven member b entirely independent of the engagement of one gear with another, and therefore all shock to the teeth of the gears in the clutching operation between these parts is obviated, and in this respect this invention differs from any other variable-speed mechanism within my knowledge, as all of them, so far as I am aware, make a direct connection between the driving and the driven members through all or several of the gears of the mechanism.

While it is the better construction mechanically to provide the circular member $n$ with a slight endwise movement, as described, the degree of this movement is so slight that it would be mechanically possible to spring the member $n$ sufficiently out of line by the pressure of the member $x$ to cause it to contact with the member $e$, and thus become clamped, even though it had no endwise movement on the driving-shaft. Such a construction could not be as easily operated nor would it be so desirable as that described; but it is a legitimate modification of the preferred construction and would clearly fall within the scope of the invention, and a claim is drawn thereto.

Having thus described my invention, what I claim, and desire to secure by Letters Patent of the United States, is—

1. A variable-speed mechanism comprising a driving-shaft and a driven member loosely mounted thereon to transmit movement to another mechanism, a circular member as $n$, rotatable with the shaft and endwise movable thereon more or less and a gear on said member; a second circular member as $e$ with which said driven member is positively connected, pinions mounted on said second circular member and meshing with the gear on the first-named circular member, a rack for said pinions and means to hold it stationary, together with means to clamp said first and second circular members together.

2. A variable-speed mechanism comprising a driving-shaft and a driven member loosely mounted thereon to transmit motion to another mechanism, a circular member as $n$, rotatable with the shaft, gears on said circular member, supports for other gears loose on the shaft and located on either side of said circular member, gears on said supports coöperating with the gears on said circular member to rotate the driven member at variable speeds and in opposite directions, together with means to effect the clamping of said circular member between said supports, and devices to temporarily hold either one of said supports stationary.

HARRY A. KNOX.

Witnesses:
WM. H. CHAPIN,
K. I. CLEMONS.